United States Patent Office 3,376,283
Patented Apr. 2, 1968

3,376,283
1-ARABINOFURANOSYL-3-HYDROCARBYL-
CYTOSINES AND PROCESS
James H. Hunter, Kalamazoo, Mich., assignor to The Upjohn Company, Kalamazoo, Mich., a corporation of Delaware
No Drawing. Filed Oct. 21, 1965, Ser. No. 500,370
5 Claims. (Cl. 260—211.5)

This invention pertains to novel organic compounds, and is more particularly directed to 1-arabinofuranosyl-3-hydrocarbylcytosines and acid addition salts thereof. The free base 1-arabinofuranosyl-3-hydrocarbylcytosines have the formula:

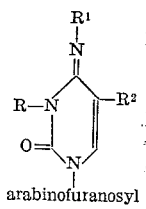

arabinofuranosyl  I wherein R is a member selected from the group consisting of alkyl of from 1 to 8 carbon atoms, inclusive, benzyl, α-methylbenzyl, and phenethyl; $R^1$ and $R^2$ are members selected from the group consisting of hydrogen and lower-alkyl (an alkyl group containing from 1 to 4 carbon atoms, inclusive).

The term "alkyl of from 1 to 8 carbon atoms, inclusive" as used herein, includes methyl, ethyl, propyl, butyl, pentyl, hexyl, heptyl, and octyl, including the various isomeric forms thereof. The term "lower-alkyl" includes methyl, ethyl, propyl, isopropyl, butyl, isobutyl, sec-butyl, and tert-butyl.

The 1-arabinofuranosyl-3-hydrocarbylcytosines of this invention are related to the effective anti-viral and anti-tumor agent, 1-β-D-arabinofuranosylcytosine (sometimes referred to in the literature as cytosine arabinoside). The new compounds differ from 1-β-D-arabinofuranosylcytosine, however, in that the 3-nitrogen of the pyrimidine ring is hydrocarbyl substituted. It has been found that the new 1-arabinofuranosyl-3-hydrocarbylcytosines of Formula I possess unexpected advantages over the parent compound, 1-β-D-arabinofuranosylcytosine. The new compounds are, like the parent compound, efficacious anti-viral agents. But the new compounds are less toxic to animals than 1-β-D-arabinofuranosylcytosine, and they are more resistant to enzymatic cleavage of the 4-amino group. Hence, the new compounds possess an improved therapeutic index in the animal body, and persists longer in the presence of deaminases.

The new 1-arabinofuranosyl-3-hydrocarbylcytosines (compounds according to Formula I) can be prepared by alkylating a 1-arabinofuranosylcytosine with alkylating agents, for example, methyl sulfate, ethyl sulfate, propyl sulfate, isopropyl sulfate, butyl sulfate, neopentyl sulfate, hexyl sulfate, octyl sulfate, methyl iodide, sec-butyl iodide, heptyl iodide, diazomethane, diazobutane, benzyl chloride, α-methylbenzyl chloride, phenethyl chloride, and the like.

The 1-arabinofuranosylcytosine and alkylating agent are mixed in the presence of an inert organic medium and heated moderately to effect the reaction. Suitable inert organic media include dimethylformamide (preferred), dimethyl sulfoxide, dimethylacetamide, and the like. The reaction proceeds at temperatures in the rang about 25° C. to about 100° C. Advantageously, the reaction mixture is heated to a temperature in the range—about 30° C. to about 40° C., preferably about 35° to 38° C. The reaction mixture should be kept substantially anhydrous. After the reaction is complete, the product is recovered and purified by conventional methods, illustratively, by precipitation with an inert organic medium in which 1-arabinofuranosyl-3-hydrocarbylcytosine free base or acid addition salt is essentially insoluble, for example, ethyl acetate; by filtration; and by recrystallization.

The 1-arabinofuranosylcytosine starting compounds are known and can be prepared by known methods. Illustratively, 1-β-D-arabinofuranosylcytosine can be prepared according to the procedure described in U.S. Patent No. 3,116,282 and by the procedure described by Walwick, Dekker and Roberts, Proc. Chem. Soc., March 1959, p. 84. Other 1-arabinofuranosylcytosine starting compounds can be prepared according to the procedure described in U.S. Patent No. 3,116,282.

The acid addition salts of this invention are obtained by neutralizing the free base compounds of Formula I with an acid according to conventional methods. Illustratively, the free base compounds can be neutralized with a stoichiometric amount of an acid; and depending upon the nature of the solvent employed, the desired 1-arabinofuranosyl-3-hydrocarbylcytosine acid addition salt will precipitate spontaneously or can be precipitated by the addition of a solvent in which the salt is insoluble. Acid addition salts can also be prepared metathetically by reactng a 1-arabinofuranosyl-3-hydrocarbylcytosine acid addition salt with an acid that is stronger than the acid of the starting acid addition salt. Pharmacologically acceptable acid addition salts can be prepared using acids, for example, sulfuric acid, methylsulfuric acid, hydrochloric, hydrobromic, nitric, phosphoric, benzoic, p-toluenesulfonic, salicylic, acetic, propionic, pamoic, tartaric, citric, and succinic acids. Similarly acid addition salts can be prepared with acids such as picric acid, fluosilicic, thiocyanic, and like acids.

The acid addition salts of this invention are useful in the purification of the free bases. Amine fluosilicate acid addition salts of 1-arabinofuranosyl-3-hydrocarbylcytosine prepared in accordance with U.S. Patents 1,915,334 and 2,075,359 are effective moth-proofing agents. Thiocyanate acid addition salts of 1-arabnofuranosyl-3-hydrocarbyl-cytosines condensed with formaldehyde in accordance with U.S. Patents 2,425,320 and 2,606,155 to form amine thiocyanate-formaldehyde condensation products are useful as pickling inhibitors.

The following examples are illustrative of the process and products of the present invention but are not to be construed as limiting.

EXAMPLE 1

Preparation of 1-β-D-arabinofuranosyl-3-methylcytosine hydrogen methyl sulfate

Two ml. of methyl sulfate was added to a suspension of 500 mg. (2.06 millimoles) of 1-β-D-arabinofuranosyl-cytosine in 5.0 ml. of redistilled dimethylformamide.

While excluding moisture, the reaction mixture was warmed by immersing the reaction vessel in a heating bath at a temperature of about 35° to 36° C. With frequent swirling, solution was effected in about 15 minutes. Heating was continued for an additional 20 minutes and 20 ml. of anhydrous methanol was added. The reaction mixture was then diluted with 100 ml. of ethyl acetate, added slowly and in portions, so that the point of incipient precipitation was not exceeded. The mixture was slightly cloudy, and when the cloudiness disappeared, more ethyl acetate was added until the mixture again became cloudy. Over an interval of 30 minutes additional small quantities of ethyl acetate were added in order to maintain cloudiness. Crystallization began spontaneously. After adding a small volume of ethyl acetate, the crystallizing mixture was set aside at about 25° C. for about 20 hours. The crystals that formed were collected on a filter, washed with a chilled mixture of methanol and ethyl acetate (15 parts to 85 parts, respectively), and dried. The crystals were dissolved in warm methanol and the solution was filtered through a bed of diatomaceous silica [diatomaceous silica had been treated with 6 N hydrochloric acid; filtered; washed successively with 6 N hydrochloric acid, 0.5 N sodium hydroxide, water, methanol, and anhydrous ether; and dried]. The filter bed was washed with methanol. The filtrate and the methanol wash were combined, warmed, and diluted cautiously with ethyl acetate to incipient crystallization. After setting aside at about 25° C. for several hours, the crystals were collected on a filter, washed with the cold mixture of methanol and ethyl acetate and dried. There was thus obtained 460 mg. (77.4% yield) of 1-β-D-arabinofuranosyl-3-methylcytosine hydrogen methyl sulfate having a M.P. of 176° to 177° C.

*Analysis.*—Calcd. for $C_{11}H_{19}N_3O_9S$: C, 35.77; H, 5.18; N, 11.38; S, 8.68. Found: C, 35.70; H, 5.30; N, 11.87; S, 8.78.

Optical rotation: $[\alpha]_D^{23°} +101°$ (c., 0.5552 in water).

Ultraviolet absorption:

$$\lambda_{max.}^{0.1\,N\,HCl}\ 279\ (\epsilon\ 13{,}000)$$

$$\lambda_{max.}^{0.1\,N\,NaOH}\ 224;\ 269\ (\epsilon\ 12{,}200;\ 11{,}100)$$

Infrared absorption (characteristic absorption frequencies): OH, 3320; C=O/C=C/C=N, 1705, 1675, 1645, 1545; $SO_4^\ominus$/C—O/C—N, 1245, 1225, 1205, 1165, 1075, 1055.

N.M.R. Spectrum supports structure assigned.

EXAMPLE 2

Following the procedure of Example 1, but substituting ethyl sulfate, propyl sulfate, isopropyl sulfate, butyl sulfate, neopentyl sulfate, hexyl sulfate, octyl sulfate, benzyl chloride, α-methylbenzyl chloride, and phenethyl chloride for methyl sulfate, there were prepared 1-β-D-arabinofuranosyl-3-ethylcytosine hydrogen ethyl sulfate, 1-β-D-arabinofuranosyl-3-propylcytosine hydrogen propyl sulfate, 1-β-D-arabinofuranosyl-3-isopropylcytosine hydrogen isopropyl sulfate, 1 - β-D-arabinofuranosyl-3-butylcytosine hydrogen butyl sulfate, 1-β-D-arabinofuranosyl-3-neopentylcytosine hydrogen neopentyl sulfate, 1-β-D-arabinofuranosyl-3-hexylcytosine hydrogen hexyl sulfate, 1 - β - D-arabinofuranosyl-3-octylcytosine hydrogen octyl sulfate, 1 - β-D-arabinofuranosyl-3-benzylcytosine hydrochloride, 1 - β - D - arabinofuranosyl-3-α-methylbenzylcytosine hydrochloride, and 1-β-D-arabinofuranosyl-3-phenethylcytosine hydrochloride, respectively.

EXAMPLE 3

Following the procedure of Example 1, but substituting 1 - β-D-arabinofuranosyl-5-methylcytosine, 1-β-D-arabinofuranosyl - 5-ethylcytosine, 1-β-D-arabinofuranosyl - 5 - isopropylcytosine, and 1 - β - D - arabinofuranosyl - 5-butylcytosine for 1-β-D-arabinofuranosylcytosine, there were prepared 1-β-D-arabinofuranosyl-3,5-dimethylcytosine hydrogen methyl sulfate, 1-β-D-arabinofuranosyl-3-methyl-5-ethylcytosine hydrogen methyl sulfate, 1 - β - D - arabinofuranosyl-3-methyl-5-isopropylcytosine hydrogen methyl sulfate, and 1-β-D-arabinofuranosyl-3-methyl-5-butylcytosine hydrogen methyl sulfate, respectively.

EXAMPLE 4

Following the procedure of Example 1, but substituting 1 - β-D-arabinofuranosyl-$N^4$-methylcytosine, 1-β-D-arabinofuranosyl - $N^4$ - isopropylcytosine, 1-β-D-arabinofuranosyl-$N^4$-butylcytosine, and 1-β-D-arabinofuranosyl-$N^4$,5 - dimethylcytosine for 1-β-D-arabinofuranosylcytosine, there were prepared 1-β-D-arabinofuranosyl-3,$N^4$-dimethylcytosine hydrogen methyl sulfate, 1-β-D-arabinofuranosyl-3-methyl-$N^4$-isopropylcytosine hydrogen methyl sulfate, 1 - β-D-arabinofuranosyl-3-methyl-$N^4$-butylcytosine hydrogen methyl sulfate, and 1-β-D-arabinofuranosyl - 3,$N^4$,5-trimethylcytosine hydrogen methyl sulfate, respectively.

The 1-arabinofuranosyl-3-hydrocarbylcytosines can be recovered in the free base form by neutralizing a 1-arabinofuranosyl-3-hydrocarbylcytosine acid addition salt with a weak base such as dilute ammonium hydroxide. Illustratively, 1 - β-D-arabinofuranosyl-3-methylcytosine, 1-β-D-arabinofuranosyl-3-ethyl-, 1-β-D-arabinofuranosyl-3 - propyl-, 1-β-D-arabinofuranosyl-3-isopropyl-, 1-β-D-arabinofuranosyl - 3-butyl-, 1-β-D-arabinofuranosyl-3-neopentyl-, 1-β-D-arabinofuranosyl-3-hexyl-, 1-β-D-arabinofuranosyl - 3 - octyl-, 1-β-D-arabinofuranosyl-3-α-methylbenzyl-, 1-β-D-arabinofuranosyl - 3 - phenethyl-, 1-β-D-arbinofuranosyl-3,5-dimethyl-, 1 - β - D-arabinofuranosyl-3-methyl-5-ethyl-, 1 - β - D-arabinofuranosyl-3-methyl-5-isopropyl-, 1-β-D-arabinofuranosyl - 3 - methyl-5-butyl-, 1-β-D-arabinofuranosyl - 3,$N^4$-dimethyl-, 1-β-D-arabinofuranosyl-3-methyl - $N^4$-isopropyl-, 1-β-D-arabinofuranosyl-3-methyl-$N^4$-butyl-, and 1 - β-D-arabinofuranosyl-3,$N^4$,5-trimethylcytosine were prepared.

I claim:

1. Compounds selected from the group consisting of (1) free base 1-arabinofuranosyl-3-hydrocarbylcytosine of the formula:

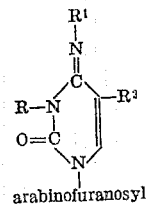

arabinofuranosyl wherein R is a member selected from the group consisting of alkyl of from 1 to 8 carbon atoms, inclusive, benzyl, α-methylbenzyl, and phenethyl; $R^1$ and $R^2$ are members selected from the group consisting of hydrogen and lower-alkyl, and (2) acid addition salts thereof.

2. 1 - β - D - arabinofuranosyl-3-alkylcyostine acid addition salt wherein "alkyl" is of from 1 to 8 carbon atoms, inclusive.

3. 1 - β - D - arabinofuranosyl-3-methylcytosine hydrogen methyl sulfate.

4. Compounds selected from the group consisting of (1) free base 1-arabinofuranosyl-3-hydrocarbylcytosine of the formula:

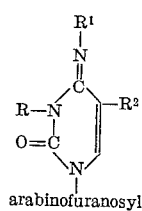

arabinofuranosyl wherein R is a member selected from the group consisting of alkyl of from 1 to 8 carbon atoms, inclusive, benzyl, α-methylbenzyl, and phenethyl; $R^1$ and $R^2$ are members selected from the group consisting of hydrogen and lower-alkyl, (2) pharmacologically acceptable acid addition salts thereof.

5. 1 - β - D - arabinofuranosyl-3-alkylcytosine pharmacologically acceptable acid addition salt wherein "alkyl" is of from 1 to 8 carbon atoms.

References Cited
UNITED STATES PATENTS 3,155,646 11/1964 Hunter _____ 260—211.5
3,300,478 1/1967 Wechter _____ 260—211.5

OTHER REFERENCES

Brown: "The Pyrimidines," 1962, pp. 365–374, Interscience Publishers, New York, N.Y.

Cordeilhac et al.: Cancer Research, vol. 24, 1964, pp. 1595–1603.

LEWIS GOTTS, *Primary Examiner.*

J. R. BROWN, *Assistant Examiner.*